United States Patent

[11] 3,547,080

| | | |
|---|---|---|
| [72] | Inventor | Marvin Earl Russell<br>Madison, Wis. |
| [21] | Appl. No. | 800,957 |
| [22] | Filed | Feb. 20, 1969 |
| [45] | Patented | Dec. 15, 1970 |

[54] AIR RESERVE INDICATOR FOR MILKING SYSTEMS
5 Claims, 3 Drawing Figs.

[52] U.S. Cl. .................................................. 119/14.14
[51] Int. Cl. .................................................. A01j 07/100
[50] Field of Search .................................... 119/14.14, 14.17, 14.44, 14.08, 14.01; 137/557

[56] References Cited
UNITED STATES PATENTS

| 1,656,134 | 1/1928 | Birkett | 119/14.14X |
| 2,129,482 | 9/1938 | Severin | 137/557 |
| 2,676,560 | 4/1954 | Thomas | 119/14.14X |
| 3,302,613 | 2/1967 | Noorlander | 119/14.14 |

Primary Examiner—Hugh R. Chamblee
Attorney—John W. Michael, Gerrit D. Foster, Bayard H. Michael, Paul R. Puerner, Joseph A. Gemignani, Andrew O. Riteris and Spencer B. Michael ABSTRACT: An air reserve indicator for a milking system including an orifice meter having a tubular body connected between the vacuum regulator and the vacuum line of the milking system. The tubular body member is provided with an orifice mounted therein adapted to create a pressure differential in the meter as air flows therethrough. A differential pressure switch is operatively connected to the orifice meter for actuation at a predetermined pressure differential in the meter. The closing of the switch will energize an electrically operated signal device such as a light bulb to warn the operator that a loss in air reserve has occurred in the system.

PATENTED DEC 15 1970

3,547,080

Inventor
Marvin E. Russell
By Paul R. Puerner
Attorney

AIR RESERVE INDICATOR FOR MILKING SYSTEMS

BACKGROUND OF INVENTION

1. Field of Invention

This invention relates to a system for milking cows, and, more particularly, to an improved air-reserve indicator for use in such a system.

2. Description of Prior Art

In a conventional milking system, a vacuum regulator is provided to maintain the system vacuum at a predetermined value. The vacuum regulator is designed to control vacuum by automatically metering air from atmosphere into the system.

It is important in the proper operation of the milking system that the "air reserve" or airflow through the regulator be maintained above a given level. Operation under conditions of low air reserve results in inefficient milking which can cause mastitis in the cow and other problems. A reduction of air reserve is not evident by loss of vacuum in the system until conditions reach a point at which all vacuum is lost and thus a simple vacuum gauge cannot be relied on as an indicator of a dangerously low air reserve condition. In other words, loss in milking efficiency can occur under conditions of low air reserve before a noticeable loss in vacuum occurs.

The principle object of this invention, therefore, is to provide an improved indicator which monitors the system continuously and detects losses of air reserve accurately and provides a readily discernible signal so that corrective measures can be taken before serious problems arise.

A further object of the invention is to provide an improved regulator which indicates a loss of air reserve at a precise level and incorporates devices having a minimum of moving parts requiring little or no maintenance.

Other objects and advantages will be pointed out in, or be apparent from, the following description and claims.

SUMMARY OF INVENTION

The combination in a milking system having a set of teat cups operating under the control of the pulsator connected to a vacuum line comprising a vacuum regulator communicating with the vacuum line and operative to control the amount of vacuum in the milking system. The improved air-reserve indicator of this invention is connected between the vacuum regulator and the vacuum line and includes an orifice meter adapted to create a pressure differential proportional to the airflow therethrough and a pressure differential switch connected to the orifice meter and adapted for actuation at a predetermined pressure differential in the meter. A warning means such as an electric light bulb is connected to the pressure differential switch for energization by a source of electricity when the pressure switch is actuated.

The electrically operated warning means may thus be placed at remote locations where an operator is usually present to provide a continuous monitoring of the system during its operation to thus warn of malfunctions immediately as they occur. The combination of the orifice meter and pressure differential switch provides energization of the warning means at a precise preset level to thereby provide very accurate indication of the air reserve in the system at all times. Finally, it should be noted that the improved indicator employs a minimum of moving parts and requires little or no maintenance.

DESCRIPTION OF PREFERRED EMBODIMENT

Figure 1:
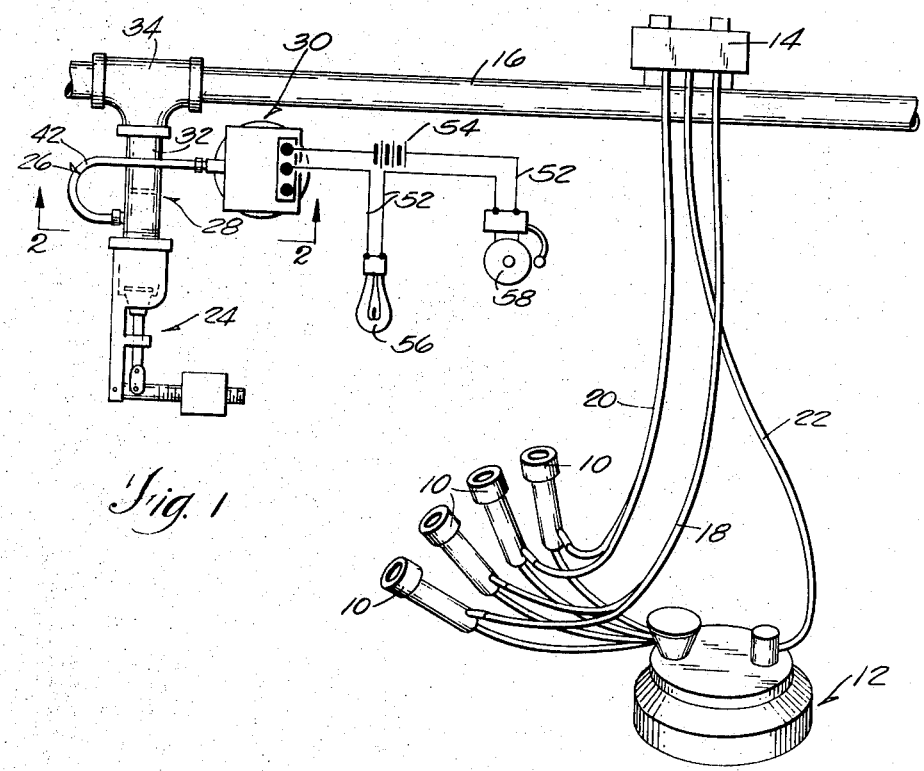
FIG. 1 is a fragmentary perspective view of a milking apparatus incorporating the present invention.

Referring to the drawings in detail, FIG. 1 shows a bucket-type milking system which includes a plurality of teat cups 10 adapted for connection to a cow to deliver milk to a bucket 12 in the usual manner. The cups are under control of a pulsator 14 mounted on a vacuum line 16 and connected to the cups 10 and bucket 12 through vacuum lines 18, 20 and 22. While the present invention is shown and described with reference to a bucket-type milking system, it should be understood that this invention could be used with other types of systems such as the so-called "pipeline" system wherein the milk from the teat cups flows into a milk line as opposed to a bucket.

In conventional milking systems, a vacuum regulator 24 (like that shown in FIG. 1) is connected to vacuum line 16. Regulator 24 may be of any suitable type, such as that disclosed in U.S. Pat. No. 3,302,613. As vacuum in line 16 builds up, the regulator valve will open at a predetermined pressure (determined by a setting of the regulator) and air from atmosphere will flow into the system to maintain the system vacuum at the desired level.

It is important to the proper operation of the milking system that the airflow through regulator 24 ("air reserve") be maintained above a given level. Operation under conditions of low "air reserve" results in inefficient milking which in turn can cause mastitis in the cow. A reduction in air flow ("air reserve") is not evidenced by a loss of vacuum in the system until conditions reach a point at which all vacuum is lost and thus a simple gauge in the system cannot be relied on as an indicator of a dangerously low "air reserve" condition.

The purpose of this invention, therefore, is to provide an improved system wherein losses of "air reserve" can be readily and conveniently detected so that corrective measures can be taken before serious losses in milking efficiency and/or injury to the cow occur.

This is accomplished by the introduction of a specially designed "air reserve" indicator means 26 into the system. Preferably, indicator 26 is connected to the downstream side of regulator 24, i.e., between the regulator 24 and the vacuum line 16.

Figure 3:
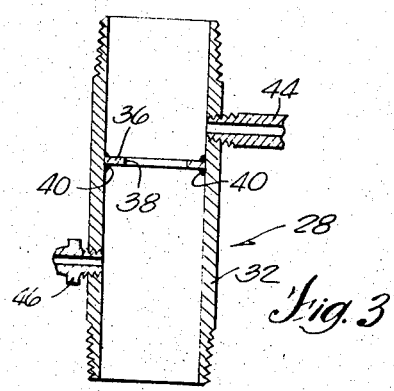
FIG. 3 is a sectional view taken along line 3-3 of FIG. 2.

Air reserve indicator 26 is comprised of two components namely an orifice meter 28 and a differential pressure switch 30. Orifice meter 28 is comprised of a body portion 32 which may be made from a galvanized pipe nipple connected at one end to the outlet of regulator 24 and connected at the other to a tee fitting 34 in vacuum line 16. As most clearly shown in FIG. 3, the body 32 of the orifice meter is provided with an orifice member 36 having a flow orifice 38 therein. Orifice member 36 may be made from a metal washer which is securely mounted in body 32 by tack welds 40.

It will be appreciated that as air flows through orifice opening 38 a pressure differential will be created across the orifice 36. Such pressure differential will be substantially directly proportional to the volumetric flow through the orifice meter 28, i.e. the greater the flow the higher the pressure differential across orifice 36. The pressure differential thus created in continuously monitored by means of a differential pressure switch 30.

Figure 2:
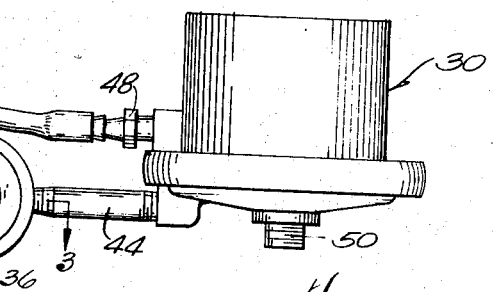
FIG. 2 is a sectional view taken along line 2-2 of FIG. 1.

The pressure differential in meter 28 is communicated to switch 30 by means of conduits 42 and 44. Conduit 42 is in the form of a flexible hose connected to the downstream side of orifice 36 by means of a fitting 46 and is connected at its other end to pressure switch 30 by means of a fitting 48. Conduit 44 is preferably in the form of a rigid pipe nipple threaded directly into the wall of body 32 and the pressure switch 30 as shown in FIG. 2. Conduit 44 thus serves to rigidly attach the switch 30 to the orifice meter 28 thereby obviating the necessity of a separate mounting means for the pressure switch.

Pressure differential switch 30 may be of any suitable design capable of sensing a predetermined pressure differential and activating an electric switch at the predetermined control point. The switch 30 is provided with an adjustment screw 50 for adjusting the pressure differential at which the switch will be activated. Since the construction details of pressure switch 30 are not part of the present invention as such and since such construction may be of conventional design, no detailed description of the switch 30 is included herein.

As schematically shown in FIG. 1, switch 30 is connected into an electric circuit containing conductors 52, a source of electricity 54 and a pair of warning devices in the form of a light 56 and a bell 58. It will be appreciated that the number and type of the warning devices selected will vary depending upon the particular installation involved and the preferences of the user. The important consideration is that the warning devices be located at points where the user will most likely notice them should they be energized by the operation of switch 30.

When installed in a milking system such as that shown in FIG. 1, the air reserve indicator of this invention is adjusted with all of the milking units connected and with the system running but not actually milking. The pressure switch is then adjusted by manipulation of adjusting screw 50 until the warning devices such as light 56 or bell 58 are energized. The rotation of adjustment screw 50 is then reversed for a turn or two, leaving the system in proper adjustment for performing its intended function.

With the system thus properly adjusted, any loss of air reserve which may occur as a consequence of plugged or partially plugged lines, air leaks in the system, vacuum regulator or vacuum pump malfunctions, etc., will be immediately and accurately indicated by the energization of the warning devices. When this occurs, the operator can take proper corrective measures before serious losses in milking efficiency and damage to the cows result.

A distinct advantage of the proposed invention is that the reserve indication is continuous during the milking and operates under actual milking conditions, not just prior to milking. Also, malfunctions are readily apparent because of the ability to place the signal devices where desired. It is appreciated that any number of signal devices may be used, limited only by the power supply. Furthermore, switching occurs at a precise level and the proposed device may be used in systems with more than one regulator. There are no moving parts in the orifice meter, and no cleaning is required.

Although but one embodiment of the present invention has been illustrated and described, it will be apparent to those skilled in the art that various changes and modifications may be made therein without departing from the spirit of the invention or from the scope of the appended claims.

I claim:

1. The combination in a milking system having a set of teat cups operating under the control of a pulsator connected to a vacuum line comprising:

a vacuum regulator means communicating with the vacuum line and operative to control the amount of vacuum in the milking system; and an air-reserve reserve indicator means connected between said vacuum regulator means and the vacuum line, said air reserve indicator means operative to indicate a drop in airflow through said vacuum regulator below a predetermined level, said air reserve indicator means including an orifice meter means adapted to create a pressure differential proportional to the airflow therethrough, a pressure differential switch means operatively connected to said orifice meter means and adapted for actuation at a predetermined pressure differential, and a warning means adapted for energization by a source of electricity when said pressure differential switch means is actuated.

2. The combination according to claim 1 in which said orifice meter means is comprised of a tubular body member through which air flows from said vacuum regulator means to said vacuum line and a disc-shaped member having an orifice opening therethrough mounted inside said tubular body member.

3. The combination according to claim 1 in which said orifice meter means communicates with said pressure differential switch means by a pair of conduit members at least one of which is a rigid member rigidly attached to said orifice meter means and said pressure differential switch means.

4. An air-reserve indicator for detecting a drop in air flow through a vacuum regulator to the vacuum line of a milking system comprising:

an orifice meter means adapted to create a pressure differential proportional to the airflow therethrough, said orifice meter means including a tubular body member connected at one end to the vacuum regulator and at the other end to the vacuum line of the milking system;

a pressure differential switch means operatively connected to said orifice meter means and adapted for actuation at a predetermined pressure differential; and a warning means adapted for energization by a source of electricity when said pressure differential switch means is actuated.

5. An air-reserve indicator according to claim 4 in which said tubular body member of said orifice meter means communicates with said pressure differential switch means by a pair of conduit members at least one of which is a rigid member rigidly attached to said tubular body member and said pressure differential switch means.